(12) United States Patent
Kaneko et al.

(10) Patent No.: US 9,777,876 B2
(45) Date of Patent: Oct. 3, 2017

(54) CONNECTOR

(71) Applicants: TOYODA GOSEI CO., LTD., Kiyosu-shi, Aichi-ken (JP); HONDA MOTOR CO., LTD., Minato-ku, Tokyo (JP)

(72) Inventors: Kenichiro Kaneko, Kiyosu (JP); Naoki Mori, Kiyosu (JP); Kenta Kuwayama, Kiyosu (JP); Yoshikazu Kaneyasu, Wako (JP); Masaru Tomimatsu, Wako (JP); Shoji Uhara, Wako (JP)

(73) Assignees: TOYODA GOSEI CO., LTD., Aichi-pref. (JP); HONDA MOTOR CO., LTD., Tokyo (JP)

( * ) Notice: Subject to any disclaimer, the term of this patent is extended or adjusted under 35 U.S.C. 154(b) by 877 days.

(21) Appl. No.: 13/626,928

(22) Filed: Sep. 26, 2012

(65) Prior Publication Data
US 2013/0082459 A1    Apr. 4, 2013

(30) Foreign Application Priority Data

Sep. 29, 2011  (JP) .................................. 2011-213885
Sep. 5, 2012   (JP) .................................. 2012-194775

(51) Int. Cl.
F16L 37/14    (2006.01)
F16L 37/084   (2006.01)
F16L 37/088   (2006.01)

(52) U.S. Cl.
CPC ........... *F16L 37/144* (2013.01); *F16L 37/088* (2013.01); *F16L 37/0841* (2013.01); *F16L 2201/10* (2013.01)

(58) Field of Classification Search
CPC ... F16L 37/088; F16L 37/084; F16L 2201/10; F16L 37/144; F16L 37/0841
(Continued)

(56) References Cited

U.S. PATENT DOCUMENTS 7,494,156 B2   2/2009  Okada
7,552,948 B2   6/2009  Matsuno et al.
(Continued)

FOREIGN PATENT DOCUMENTS

CN    101072967 A    11/2007
JP    2004-3588 A     1/2004
(Continued)

*Primary Examiner* — Gregory Binda
*Assistant Examiner* — Zachary Dragicevich
(74) *Attorney, Agent, or Firm* — Posz Law Group, PLC

(57) ABSTRACT

The connector comprises a housing having a connection hole where a pipe with a flange is inserted, a retainer having a latching portion that retains the pipe by being arranged at a location facing the connection hole and engaged with the flange, and a checker that is supported by the housing at the retaining position and is movable from the retaining position to the connection confirmation position when the pipe is inserted into the connection hole up to the normal connection position. The checker is configured to release the engagement between the latching portion and the flange, when at the connection confirmation position, by having the retainer that is engaged with the flange of the pipe at the normal connection position pushed to expand the distance of the retainer so that the pipe can be pulled out from the connection hole.

12 Claims, 13 Drawing Sheets

(58) Field of Classification Search
USPC .................................. 285/321, 93, 23, 319
See application file for complete search history.

(56) References Cited

U.S. PATENT DOCUMENTS

| | | | |
|---|---|---|---|
| 2007/0236012 A1* | 10/2007 | Kerin | F16L 37/088 |
| | | | 285/308 |
| 2010/0276924 A1* | 11/2010 | Gillet | F16L 37/088 |
| | | | 285/93 |
| 2011/0127766 A1* | 6/2011 | Tsurumi | 285/305 |
| 2012/0161435 A1* | 6/2012 | Yamada et al. | 285/305 |
| 2012/0326435 A1* | 12/2012 | Okazaki | 285/84 |
| 2013/0154255 A1* | 6/2013 | Daimon et al. | 285/81 |

FOREIGN PATENT DOCUMENTS

| | | |
|---|---|---|
| JP | 2004-125158 A | 4/2004 |
| JP | 2005-337317 A | 12/2005 |
| JP | 2007-292290 A | 11/2007 |
| JP | 2009-121668 A | 6/2009 |
| WO | 2012-043024 A1 | 4/2012 |

\* cited by examiner

CONNECTOR

This application claims the benefit of and priority from Japanese Applications No. 2011-213885 filed Sep. 29, 2011 and No. 2012-194775 filed Sep. 5, 2012, the content of which are incorporated herein by reference.

BACKGROUND OF THE INVENTION

1. Field of the Invention

The invention relates to a connector that connects pipes all in one touch.

2. Description of the Related Art

A connector is disclosed in JP-A 2009-121668. The connector is provided with a connector main body, a retainer and a checker. The connector main body is formed to allow a pipe to be inserted therein. The retainer is fitted into the connector main body to be movable to a retaining position where the pipe inserted into the connector main body is prevented from being pulled out. The checker can be moved to the retaining position when the pipe is fully inserted into the connector main body up to the normal connection position, and its movement to the retaining position is inhibited if the pipe is not fully inserted. This makes it possible to confirm full insertion of the pipe up to the normal connection position of the connector main body by the user being judging the movement of the retainer to the retaining position.

However, in the connector, when there is a need for removing the pipe from the connector main body, the engagement portion of the retainer that is engaged with the connector main body has to be manually disengaged by elastically deforming it in the radial direction, which is a labor intensive process requiring detail-oriented work.

SUMMARY

An advantage of some aspects of the invention is to provide a connector that allows easy removal of the pipe.

According to an aspect of the invention, there is a connector for connecting a pipe with a flange. The connector comprises; a housing that has a connection hole where the pipe is to be inserted, a retainer that has a latching portion arranged at a location facing the connection hole, wherein the latching portion is configured to retain the pipe by engaging with the flange, and a checker that is supported by the housing at a retaining position and is movable from the retaining position to a connection confirmation position when the pipe is inserted into the connection hole to a normal connection position. The housing includes engagement catches that are arranged at locations where the checker is inserted, the checker that includes engagement protrusions to be engaged with the engagement catches to support the checker at the retaining position, and the checker is further configured such that when the checker is pushed at the normal connection position, the retainer engaged with the flange at the normal connection position moves in a direction away from the flange and releases the engagement between the latching portion and the flange, thereby the pipe enabling to be pulled out from the connection hole.

According to the connector described in the application example, inserting a pipe into the connection hole of the connector prevents the pipe from being pulled out by means of having the flange of the pipe engaged with the engagement portion of the retainer, which makes the connection work easier. Also, when the pipe is inserted into the connector up to the normal connection position, the normal positioning of the pipe can be confirmed by moving the checker from the retained position to the connection confirmation position.

The checker, while being at the connection confirmation position, releases the engagement of the engagement portion with the flange by means of pushing the retainer that is engaged with the flange of the pipe at the normal connection position in the retracting direction away from the flange, thereby allowing an easy pull-out of the pipe from the connection hole.

After moving to the connection confirmation position for confirmation of the pipe's normal connection position, the checker remains assembled to the housing, which can be effectively used to remove the pipe.

(2) The retainer can be configured to form integrally with the housing, and further configured to be supported in cantilever by the housing around the periphery of the connection hole so as to form in an arch surrounding the connection hole. This configuration makes it easier to assemble the retainer without increasing the number of components.

(3) The retainer can be configured to have a holder at the free end of the cantilever, while the checker can be configured to have a press-down part for applying a force to expand the distance of the retainer by engaging itself with the holder. This configuration prevents the pipe from advertently coming off the connector since the press-down part is engaged with the holder of the retainer to restrict the retainer from opening up without applying a force in the direction of releasing the checker under the situation where the pipe is connected to the connector at the normal connection position, even if the pipe is given a pull-out force.

(4) The checker comprises a checker base and activation pieces each provided protruded from both sides of said checker base in cantilever to surround the connection hole, each having a portion to be pressed on each free-end side, and the housing comprises a locking stopper facing the connection hole, and the portion to be pressed restricts the movement of the checker to the connection confirmation position by having the checker engaged with the locking stopper when the checker is at the retaining position, while the distance expansion of the activation pieces releases the engagement with the locking stopper when the pipe is at the normal connection position, thus allowing the checker to be configured so as to move to the connection confirmation position.

(5) The checker comprises a checker base and activation pieces is each provided protruded from both sides of said checker base in cantilever to surround the connection hole, and the activation pieces each have a portion to be pressed provided protruded toward the center of the connection hole, while the portion to be pressed is arranged at the center of the maximum length to be pressed by the flange of the pipe and can be configured to expand the distance of the activation pieces by being pressed by the pipe flange.

(6) The housing comprises a locking stopper facing the connection hole as well as a latching end on the free side of the activation piece, and the latching end restricts the checker from moving to the connection confirmation position by having the checker engaged with the locking stopper when the checker is at the retaining position.

(7) The checker can be configured to have the protrusion described above to prevent any push-in when at the connection confirmation position, which is elastically deformed when a given amount of insertion force or larger is applied to the checker to move said checker in the retracting direction.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
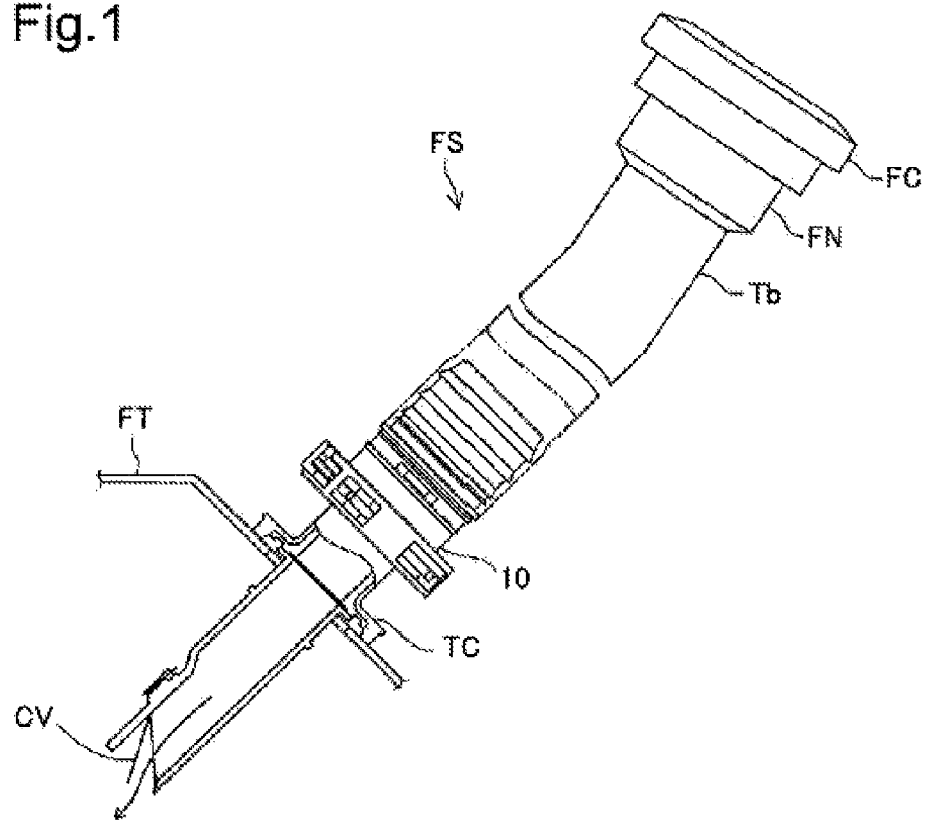
FIG. 1 is a schematic diagram showing the configuration of a connector according to the first embodiment of the present invention applied to a fueling device of a fuel tank.

A. First Embodiment (1) Schematic Configuration of the Fueling Device FS of the Fuel Tank FIG. 1 is a schematic diagram showing the connector 10 according to the first embodiment of the present invention applied to the fueling device FS of the fuel tank. As shown in FIG. 1, the fueling device FS is connected to the fuel tank FT to send fuel supplied from a fueling gun (not shown) to the fuel tank FT, and comprises a filler neck FN having an inlet that can be opened and closed with a fuel cap FC, a tube Tb made of resin connected to one end of the filler neck FN, a fuel tank tube connector TC that is connected to the other end of the tube Tb and is welded to the fuel tank FT, a check valve CV attached to the fuel tank tube connector TC, and the connector 10 that connects a pipe P of the fuel tank tube connector TC to the tube Tb. According to the configuration of the fueling device FS, when the fuel cap FC is removed during refueling and fuel is poured from the fueling gun to the filler neck FN, the fuel runs through the filler neck FN, tube Tb and fuel tank tube connector TC so as to further open the check valve CV to be supplied to inside the fuel tank FT.

(2) Configuration of the Connector

Figure 2:
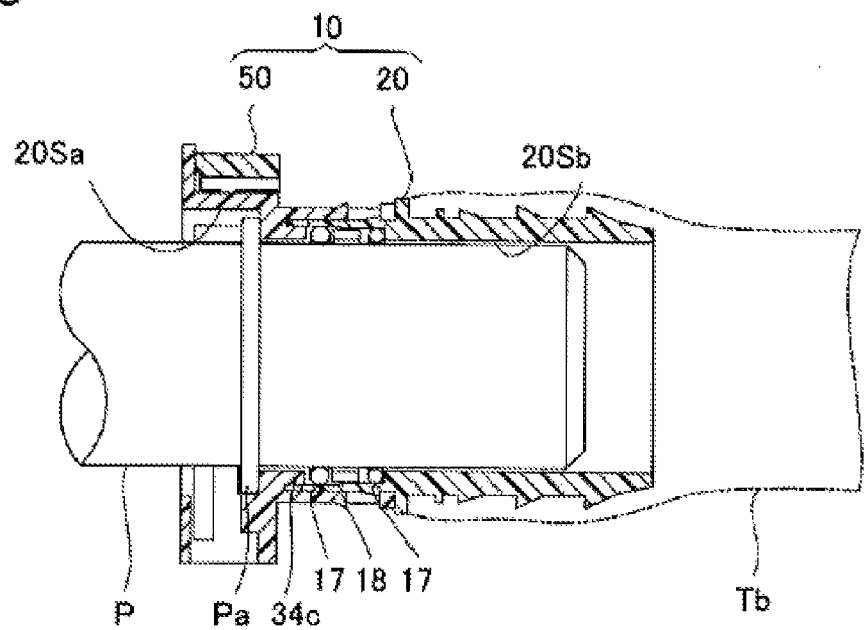
FIG. 2 is a cross section of the connector connected with a pipe.

FIG. 2 is a cross section of the connector 10 connected with the pipe P. The connector 10 is for connecting the pipe P to the tube Tb, and comprises a housing 20, O-rings 17 and 17, a spacer ring 18, and a checker 50. The pipe P is made of resin and is formed in an approximate shape of a round pipe. A pipe flange Pa consisting of a bulge protruding out in an annular shape is formed along the outer periphery of the pipe P at a given distance from the end surface thereof. The housing 20 and checker 50 will be explained below in this order.

(2)-1 Housing 20

Figure 3:
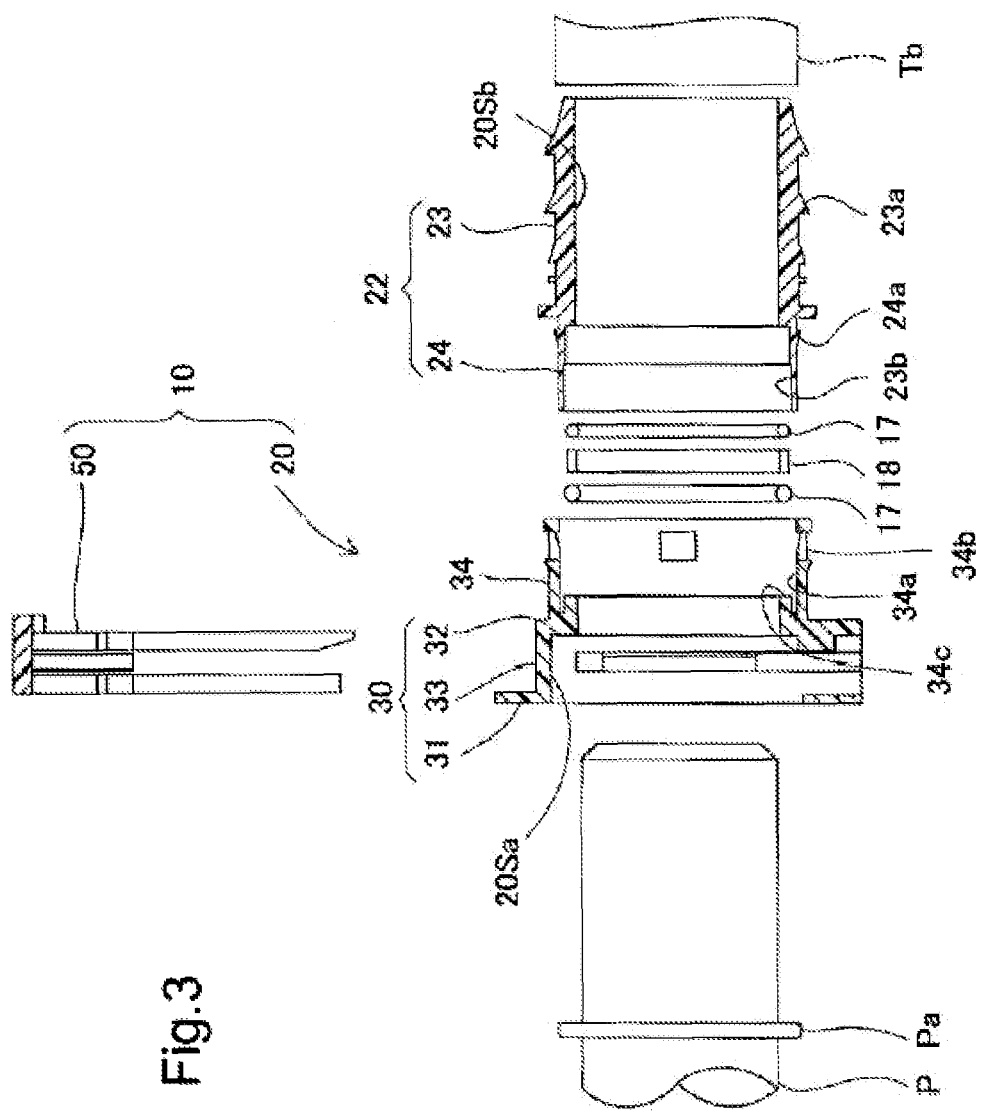
FIG. 3 is an exploded cross section of the connector.
Figure 4:
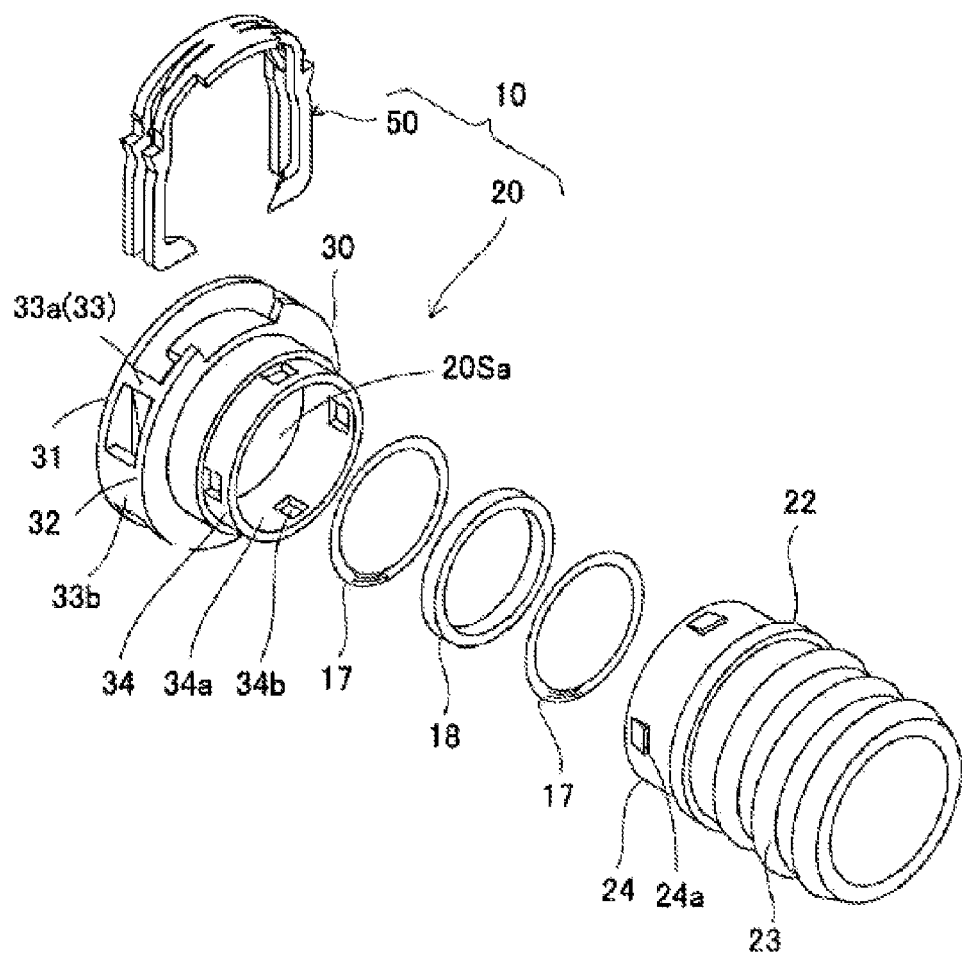
FIG. 4 is an exploded perspective view of the connector.

FIG. 3 is an exploded cross section of the connector 10 and FIG. 4 is an exploded perspective view of the same. The housing 20 is made of resin, for example, and is configured by a combination of two components each in an approximate shape of a cylinder. In other words, the housing 20 comprises a tube connecting portion 22 where the tube Tb is connected to by pressure and a pipe connecting portion 30 to be assembled to the tube connecting portion 22 in order to connect the pipe P. In the following explanation, the side of the pipe connecting portion 30 is considered the front side, and the side of the tube connecting portion 22 is considered the rear side, while the directions of up-and-down movement of the checker 50 are considered to be the mounting direction and releasing direction, and the directions in and from which the pipe P is inserted and pulled out are considered to be the insertion direction and pull-out direction, respectively.

In FIG. 3, a connection hole 20S is formed within the housing 20. The connection hole 20S comprises a first connection hole 20Sa forming a stepped hole that reduces the inner radius thereof in stages from the front to rear side and a second connection hole 20Sb. In the second connection hole 20Sb, two O-rings 17 and 17 are arranged, while a spacer ring 18 made of resin is arranged between the O-rings 17 and 17. The front O-ring 17 is retained by the sealing edge 34e of the housing 20, while the rear O-ring 17 is retained by the spacer ring 18 (see FIG. 2).

The tube connecting portion 22 comprises a connection main body 23 and an insertion portion 24 in cylindrical shapes, and is made of a resin material such as polyethylene with enhanced mechanical strength with glass filler added. On the inner wall of the connection main body 23, a seal retaining portion 23b for retaining the O-rings 17 and 17 as well as the spacer ring 18 is formed. Along the outer periphery of the connection main body 23, annular protrusions 23a are formed that work as a retainer when the tube Tb is inserted. The insertion portion 24, provided protruded beyond the edge of the connection main body 23 and formed in a shape of a thinner cylinder than the connection main body 23, is a component for integrating with the connecting portion 30, and engaging protrusions 24a are formed along the outer periphery thereof for engagement with the connecting portion 30.

In FIG. 4, the connecting portion 30 comprises a front wall 31 and a rear wall 32, and is made of a resin material such as polyethylene with enhanced flexibility with no glass filler added. The front wall 31 and the rear wall 32 are connected by a connecting portion 33. Through the front wall 31 and the rear wall 32, a first connection hole 20Sa is formed. On the rear wall 32, a connecting cylinder portion 34 is formed on the side of the tube connecting portion 22. Inside the connecting cylinder portion 34, a joint portion 34a is formed where engaging holes 34b are made through said connecting cylinder portion 34. The joint portion 34a is jointed with the insertion portion 24 of the tube connecting portion 22, which is to be integrated with the pipe connecting portion 30 by having the engaging protrusions 24a engaged with the engaging holes 34b.

Figure 5:
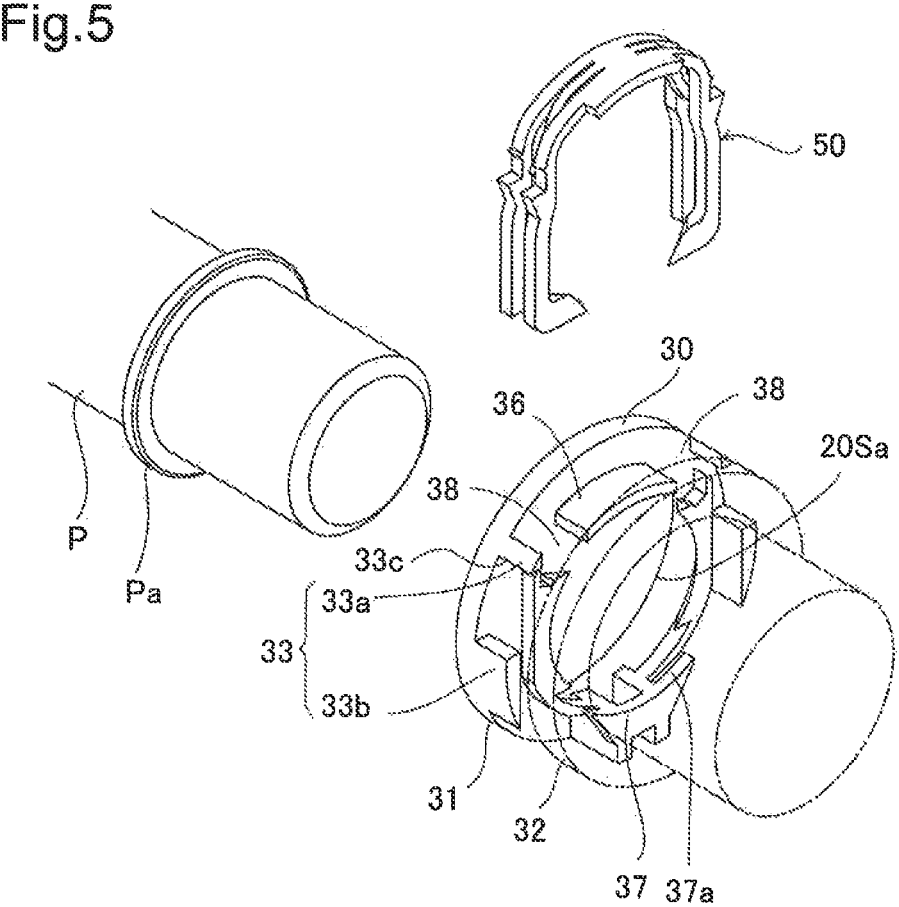
FIG. 5 is a perspective view showing a partially cutaway pipe connection.

FIG. 5 is a perspective view showing the pipe connecting portion 30 partially cut away. The connecting portion 33 comprises a first connecting portion 33a and a second connecting portion 33h that are components that connect the front wall 31 and the rear wall 32. The first connecting portion 33a is arranged at a higher location than the second connecting portion 33b. An engagement catch 33c for retaining the checker 50 is formed at the first connecting portion 33a. Between the front wall 31 and the rear wall 32, a movement restricting portion 36 for restricting the movement of the checker 50 in the mounting or releasing direction and a locking stopper 37 are formed. The movement restricting portion 36 is formed in an arch between the first connecting portions 33a. The locking stopper 37 is arranged at the lower center of the pipe connecting portion 30 and comprises a latching edge 37a formed in a crescent shape. Insertion holes 38 are formed for inserting the checker 50 on both sides of the movement restricting portion 36 between the two first connecting portions 33a.

Figure 6:
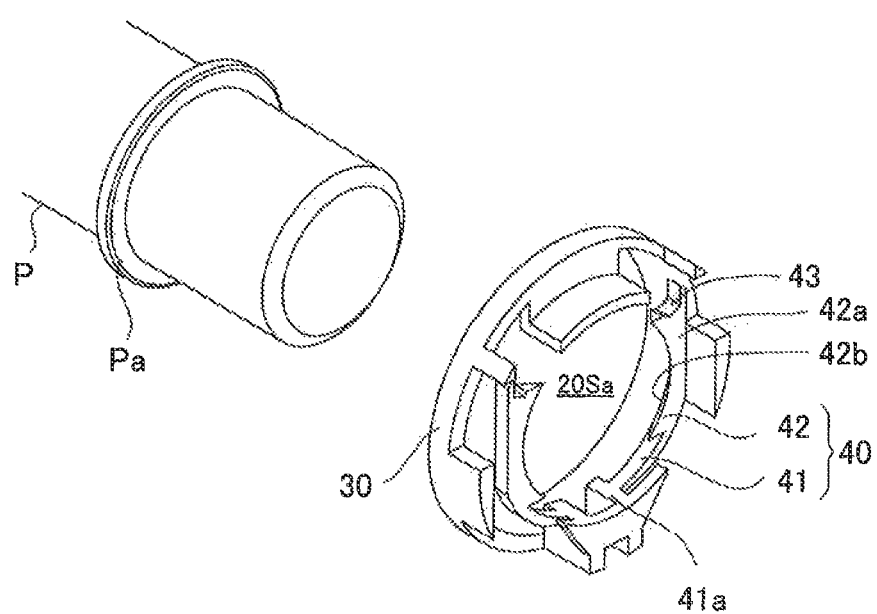
FIG. 6 shows the surroundings of the retainer of FIG. 5.

FIG. 6 is a diagram explaining the surroundings of a retainer 40. The retainer 40 has a function of pulling out the pipe P by being engaged with the flange Pa of the pipe P, and is formed integrally with the pipe connecting portion 30. In other words, the retainer 40 comprises a retainer main body 41 formed to surround the first connection hole 20S of the pipe connecting portion 30 and a latching portion 42 formed along the inner periphery of the retainer main body 41, which are integrally formed together. The retainer main body 41 is a cantilever supported by a retainer base 41a integrally formed at a lower section of the pipe connecting portion 30, acting as a fulcrum, running about half way around and is formed in an arc arm. The latching portion 42 is a protrusion formed in an arc with a given width integrally formed with the retainer main body 41 on the inner peripheral side thereof, and comprises a vertical latching plane 42a on the rear side and a slanted plane 42b on the front side. The vertical latching plane 42a is a plane for retaining the pipe P by being engaged with the flange Pa of the pipe P, while the slanted plane 42b is a plane for expanding the distance of the retainer 40 by being pushed by the flange Pa. Also, a load-bearing portion 43 is formed in the upper section of the retainer 40. The load-bearing portion 43 is a concave for bearing the downward force by the checker 50 (FIG. 5).

(2)-2 Configuration of Checker 50

Figure 7:
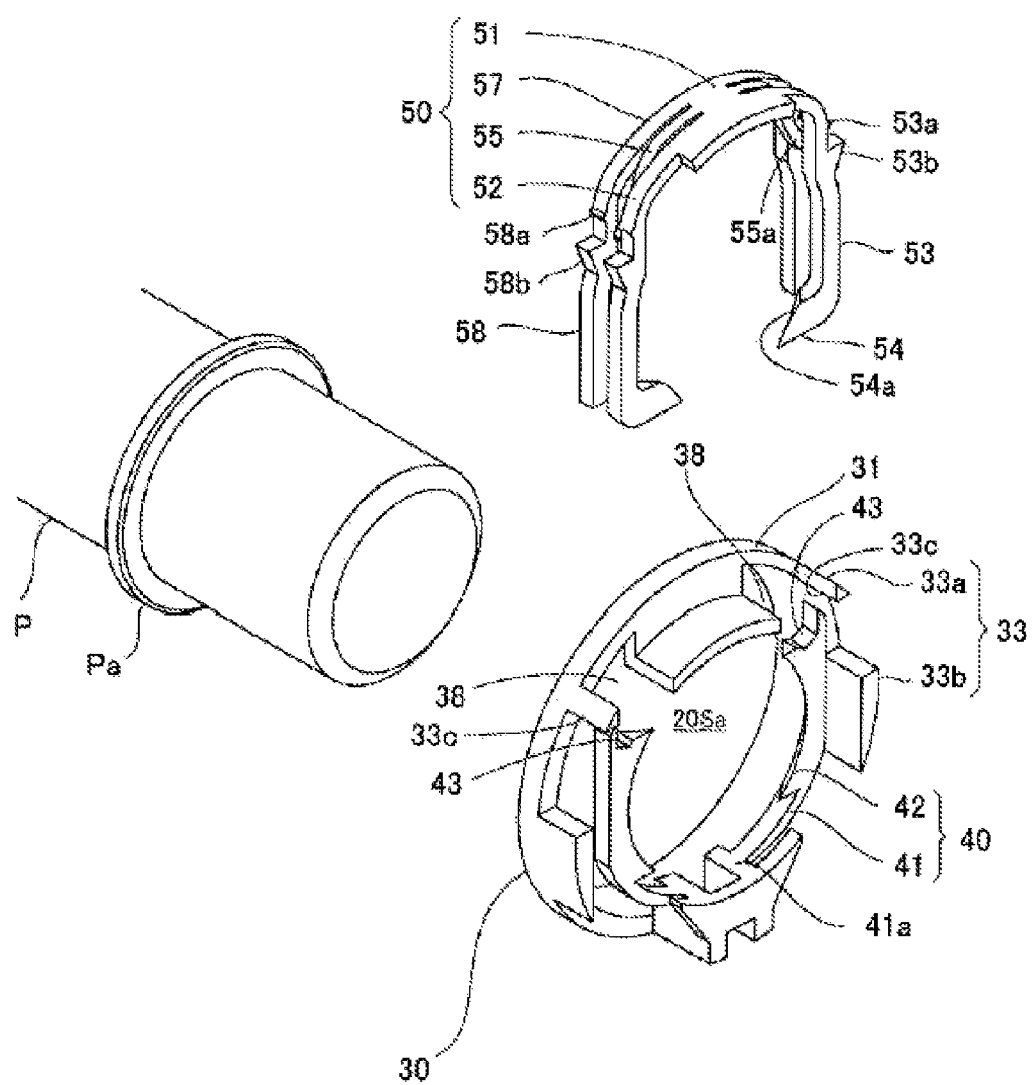
FIG. 7 is a perspective view showing the pipe connecting portion and the checker before assembly.

FIG. 7 is a perspective view showing the pipe connecting portion 30 of the housing 20 and the checker 50 before assembly. The checker 50 is a component for confirming that the pipe P is connected at the normal connection position of the connection hole 20S of the housing 20. The checker 50 comprises a checker base 51 and three cantilevers each formed from both sides thereof, that is, activation pieces 52, press-down pieces 55 and guiding pieces 57, which are integrally formed together. The activation piece 52 comprises an activation piece main body 53 formed on each side of the checker base 51 so as to run about half way around the first connection hole 20Sa. A first engagement protrusion 53a and a second engagement protrusion 53h are provided protruded from the upper section of the activation piece main body 53 to be engaged with an engagement catch 33c on each side of the first connecting portion 33a of the connecting portion 33. Also, a portion to be pressed 54 is formed at the lower end of the activation piece main body 53. In the portion to be pressed 54, a pressing plane 54a is formed. The pressing plane 54a is formed, to move, by being pushed by the flange Pa of the pipe P, to expand the distance of the activation piece main body 53 around the base of the activation piece 52, that is, the portion connected to the checker base 51, as a fulcrum—in other words, to move in the retracting direction away from the flange Pa.

The press-down piece 55 comprises a press-down end 55a on the free end side, and is formed to expand the distance of the retainer main body 41 around the retainer base 41a as a fulcrum by having the press-down end 55a hit against and push the load-bearing portion 43 of the retainer 40. The guiding piece 57 comprises a guiding piece main body 58 formed to run about half way around the first connection hole 20Sa on both sides of the checker base 51. In the upper section of the guiding piece main body 58, a first engagement protrusion 58a and a second engagement protrusion 58b are provided protruded to be engaged with both sides of the first connecting portion 33a of the connecting portion 33. The guiding piece 57 not only functions as a guide to facilitate movement of the checker 50 in the mounting and releasing directions but also makes it easier for the retainer 40 to bend and prevents wobbling thereof by securing a gap between the retainer 40 and the front wall 31.

(3) Connecting Operation of Connector 10

Figure 8:
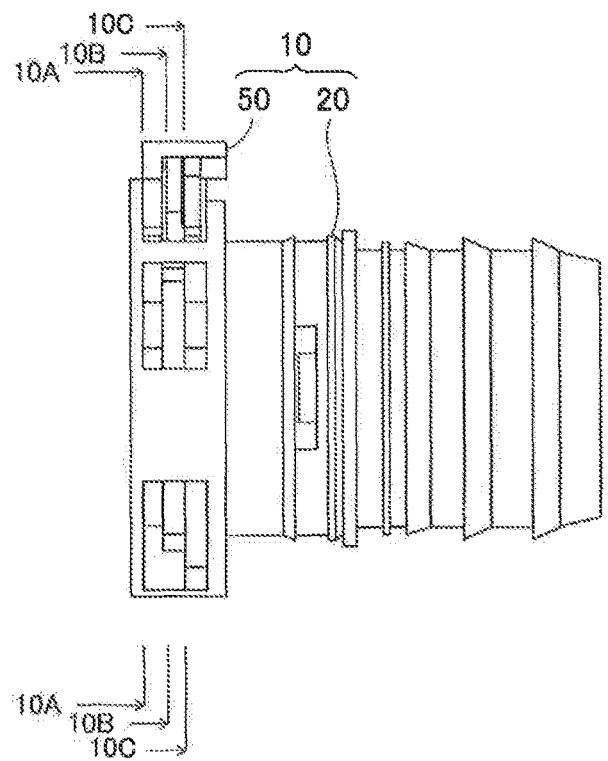
FIG. 8 shows the situation where the checker is assembled to the connector housing at the retaining position.
Figure 9:
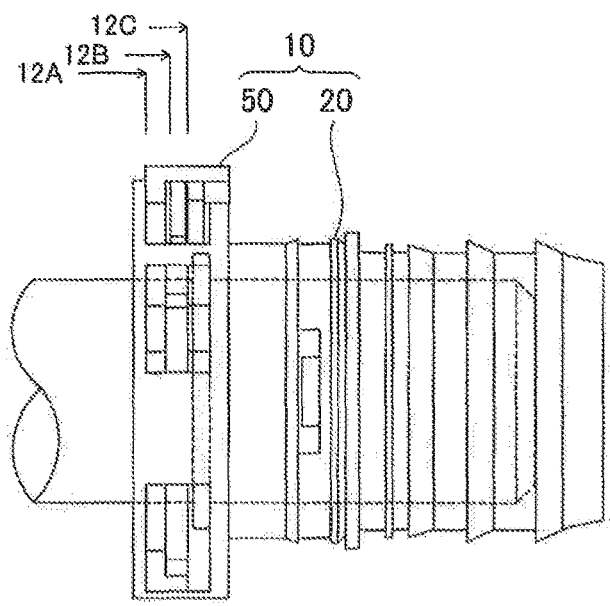
FIG. 9 shows the situation where the pipe is connected to the connector at the normal connection position and the checker is moved to the connection confirmation position.
Figure 10A:
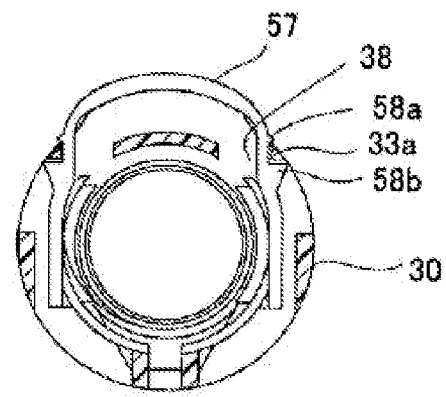
FIGS. 10A, 10B and 10C show the operation of connecting the pipe to the connector.
Figure 10B:
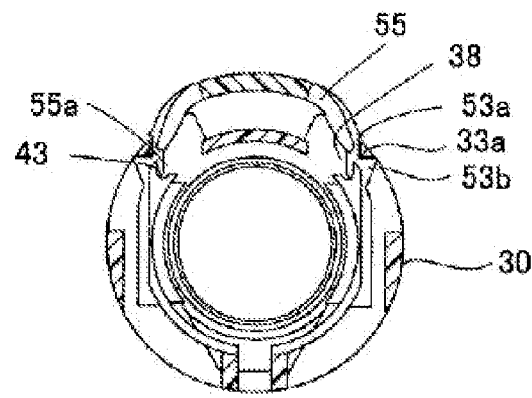
Figure 11A:
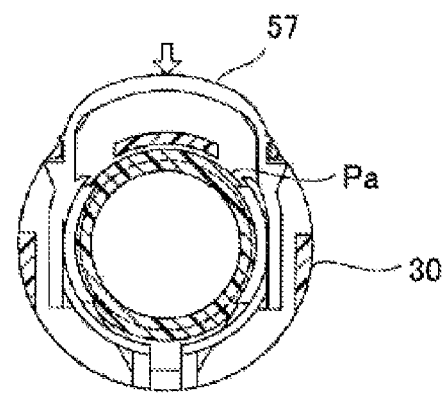
FIGS. 11A, 11B and 11C show the operation subsequent to FIGS. 10A, 10B and 10C.
Figure 11B:
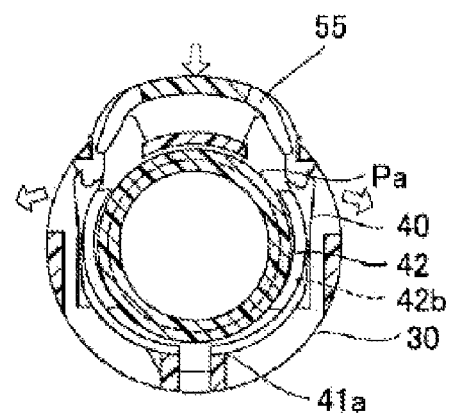
Figure 11C:
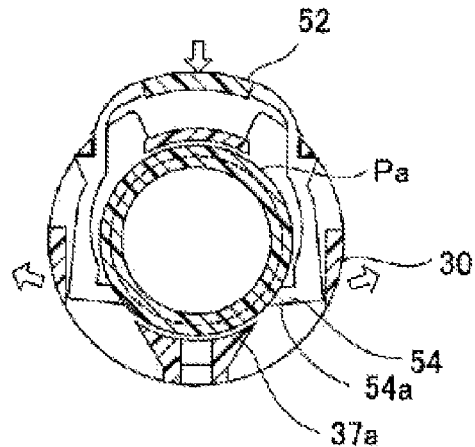

The connector 10 configured as described above is used as shown in the following figures: FIG. 8 is a diagram explaining the situation where the checker 50 is assembled to the housing 20 of the connector 10 at the retaining position, and FIG. 9 is a diagram explaining the situation where the pipe P is connected to the connector 10 at the normal connection position and the checker 50 is moved to the connection confirmation position. FIGS. 10A, 10B and 11C are cross sections along the lines 10A-10A, 10B-10B and 10C-10C of FIG. 8, and FIGS. 11A, 11B and 11C are sections showing the situation where the pipe P is inserted into the connection hole 20S of the connector 10, while FIG. 12A, FIG. 12B and FIG. 12C of are sections along the lines 12A-12A, 12B-12B and 12C-12C of FIG. 9.

(3)-1 Assembly of Checker 50 at the Retaining Position

Figure 10C:
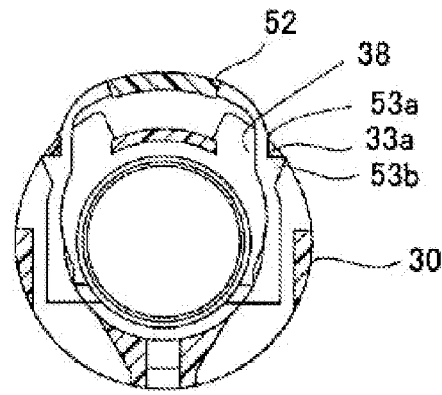

In FIG. 10A through FIG. 10C, in order to assemble the checker 50 to the housing 20, the activation pieces 52 and guiding pieces 57 are to be positioned against the insertion holes 38 of the pipe connection portion 30 to be pushed down in the mounting direction (downward). At this time, the second engagement protrusions 53h and 58h of the activation pieces 52 and the guiding pieces 57 are elastically deformed by being pushed by the first connecting portions 33a of the connecting portion 33 to override the first connecting portions 33a to be engaged therewith. This allows the checker 50 to settle at the retaining position laid out in the housing 20 with the first connecting portions 33a sandwiched by the first and second engagement protrusions 53a and 53h of the activation pieces 52 and the first and second engagement protrusions 58a and 58b of the guiding pieces 57.

(3)-2 Insertion Operation of Pipe P

As shown in FIG. 2, in order to connect the pipe P to the connector 10, the pipe P has to be inserted into the first connection hole 20Sa of the tube connecting portion 22 of the housing 20. In other words, once the pipe P is inserted into the first connection hole 20Sa, as shown in FIG. 6 and FIG. 11B, the flange Pa pushes the slanted plane 42b of the retainer 40. When the slanted plane 42b is pushed by the flange Pa of the pipe P, the retainer 40 expands its distance in cantilever around the retainer base 41a as a fulcrum, which allows the flange Pa to override the latching portion 42. Then, after overriding the flange Pa, the retainer 40 reduces its distance by elastic forces. This allows the pipe P to be inserted up to the normal connection position and retained against the connector 10 via the engagement between the flange Pa and the latching portion 42. Further, as shown in FIG. 7 and FIG. 11C, once the pipe P is inserted, the flange Pa of the pipe P pushes the pressing plane 54a of the portion to be pressed 54 to expand the distance of the activation piece 52. Under these conditions, the bottom end of the portion to be pressed 54 of the activation piece 52 is moved to a position where it does not hit the latching edge 37a of the locking stopper 37, that is, to the outer peripheral side beyond the latching edge 37a.

(3)-3 Confirmation of Checker 50's Movement to the Normal Connection Position

Figure 12A:
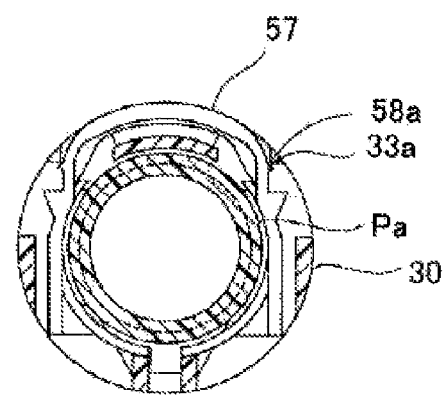
FIGS. 12A, 12B and 12C show the operation subsequent to FIGS. 11A, 11B and 11C.
Figure 12B:
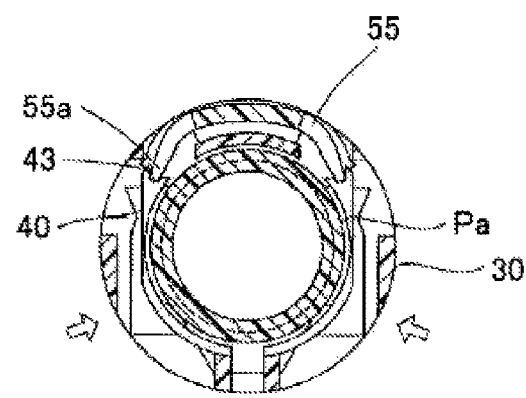
Figure 12C:
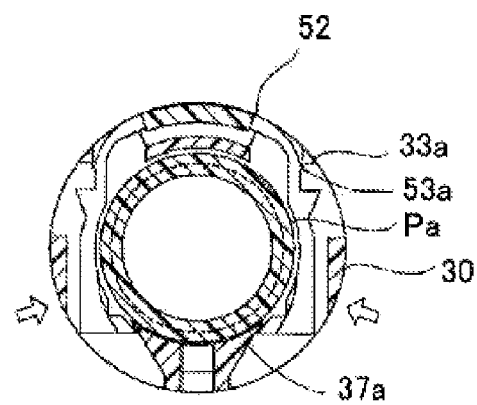

In FIG. 12, once the checker 50 is pushed downward, as shown in FIG. 11C, the bottom end of the portion to be pressed 54 of the activation piece 52 passes through the outer peripheral side beyond the position where the locking stopper 37 barely hits against the latching edge 37a to allow the checker 50 to move downward. Then, the checker 50 is positioned by having the first engagement protrusion 53a of FIG. 12C engaged with the first engagement protrusion 58a of FIG. 12A and by having the press-down end 55a of the press-down piece latched to the load-bearing portion 43. Since the checker 50 cannot be lowered unless the pipe P is inserted into the normal connection position where the flange Pa of the pipe P expands the distance of the activation piece 52, it is possible to confirm that the pipe P is at the normal connection position judging from the movement of the checker 50 to the connection confirmation position. As shown in FIG. 2, at the normal connection position, the pipe P penetrates through the O-ring 17, spacer ring 18 and the other O-ring 17 on the rear in this order, and the O-rings 17 and 17 get in contact with the outer periphery of the pipe P to complete the sealing.

(3)-4 Pull-Out Operation of Pipe P

Figure 13:
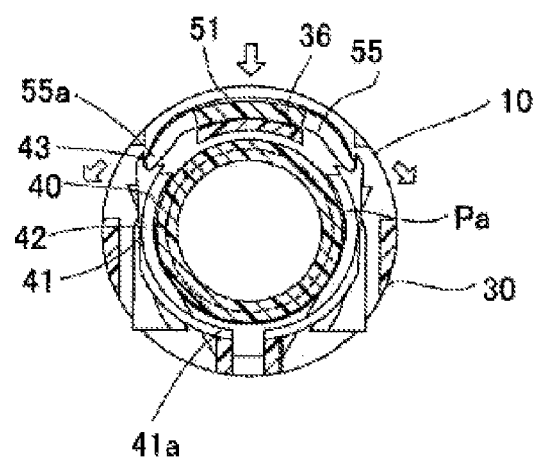
FIG. 13 shows the operation of pulling out the pipe from the connector.

FIG. 13 is a diagram explaining an operation of pulling out the pipe P from the connector 10 shown by a section corresponding to FIG. 12B. From the condition of FIG. 12B, the checker base 51 of the checker 50 is pushed in the mounting direction. As shown in FIG. 13, since the press-down end 55a of the press-down piece 55 of the checker 50 is engaged with the load-bearing portion 43 of the retainer 40, the retainer 40 receives a force downward via the press-down piece 55 and the load-bearing portion 43 so that the retainer main body 41 in cantilever expands its distance around the retainer base 41a as a fulcrum. When the checker base 51 moves down until it hits the movement restriction portion 36, the latching portion 42 expands its inner distance to allow the flange Pa of the pipe P to be removed. Under these conditions, even if a force is applied to the pipe P in the pull-out direction, the flange Pa does not hit the latching portion 42 so that the pipe P can be pulled out from the connector 10. Then, checker 50 receives an elastic restoring force via the load-bearing portion 43 and the press-down piece 55 to return to the position prior to the push-in.

(4) Functions and Effects of the Embodiment

The configuration of the embodiment exerts the following effects:

(4)-1 As shown in FIGS. 2, 10, 11 and 12, inserting the pipe P into the connection hole 20S of the connector 10 makes the connection easier by retaining the pipe P by means of having the flange Pa of the pipe P expand the distance of the retainer 40 to be engaged with the latching portion 42.

(4)-2 As shown in FIG. 11C and FIG. 12C, when the pipe P is inserted into the connector 10 up to the normal connection position, the portion to be pressed 54 of the activation piece 52 of the checker 50 is pushed by the flange Pa of the pipe P to expand the distance of the activation piece 52 up to the position where it does not hit the latching edge 37a of the locking stopper 37 so as to unlock the checker 50. Therefore, it is possible to confirm that the pipe P is at the normal connection position by moving the checker 50 to the connection confirmation position.

(4)-3 As shown in FIG. 6, since the retainer 40 is integrally formed with the pipe connection portion 30 in a form of cantilever, the assembly operation is rather easy with no increase in the number of components.

(4)-4 As shown in FIG. 13, when the checker base 51 of the checker 50 is pushed in the mounting direction (as shown by the arrow), the press-down end 55a of the press-down piece 55 of the checker 50 expands the distance of the retainer 40 around the retainer base 41a as a fulcrum to release the engagement of the latching portion 42 with the flange Pa so that the pipe P can easily be pulled out from the connector 10.

(4)-5 As shown in FIG. 12B, even if a pull-out force is applied to the pipe P without applying a force to the checker 50 in the releasing direction (i.e. opposite the arrow direction in FIG. 13) under the condition where the pipe P is connected to the connector 10 at the normal connecting position, the pipe P does not advertently come off the connector 10 because the press-down edge 55a of the press-down piece 55 is engaged with the load-bearing portion 43 of the retainer to restrict the distance expansion of the retainer 40. In addition, even if the checker 50 is mistakenly pushed, there is no way that the pipe P advertently comes off the connector 10 since the flange Pa of the pipe P remains to be engaged with the retainer 40 unless a pull-out force is applied to the pipe P.

(4)-6 As shown in FIG. 12, the checker 50 remains assembled to the housing 20 after moving to the connection confirmation position for confirmation of the normal connection position of the pipe P so that the checker 50 can effectively be used without waste to remove the pipe P.

(4)-7 In the pull-out operation of the pipe P, once the pipe P is pulled out from the connector 10, engagement of the checker 50 with the pipe connection portion 30 that restricts the movement thereof is released, and when pulled out in the releasing direction, the checker 50 returns, as shown in FIG. 10, to the retaining position where the first and second engagement protrusions 53a and 53b of the activation piece main body 53 and the first and second engagement protrusions 58a and 58b of the guiding piece main body 58 are respectively engaged with the first connecting portion 33a, thus allowing the reuse of the checker 50.

(4)-8 As shown in FIG. 3, the housing 20 is formed with two components, the tube connecting portion 22 and the pipe connecting portion 30, and enhances its mechanical strength by forming them with two resin materials having different mechanical strengths, that is, by forming the tube connecting portion 22 with resin added with glass filler, while the flexibility of the retainer 40 integrated with the pipe connecting portion 30 is improved by forming it with resin without glass filler, thus enhancing the insertion operability of the pipe P.

B. Second Embodiment

Figure 14:
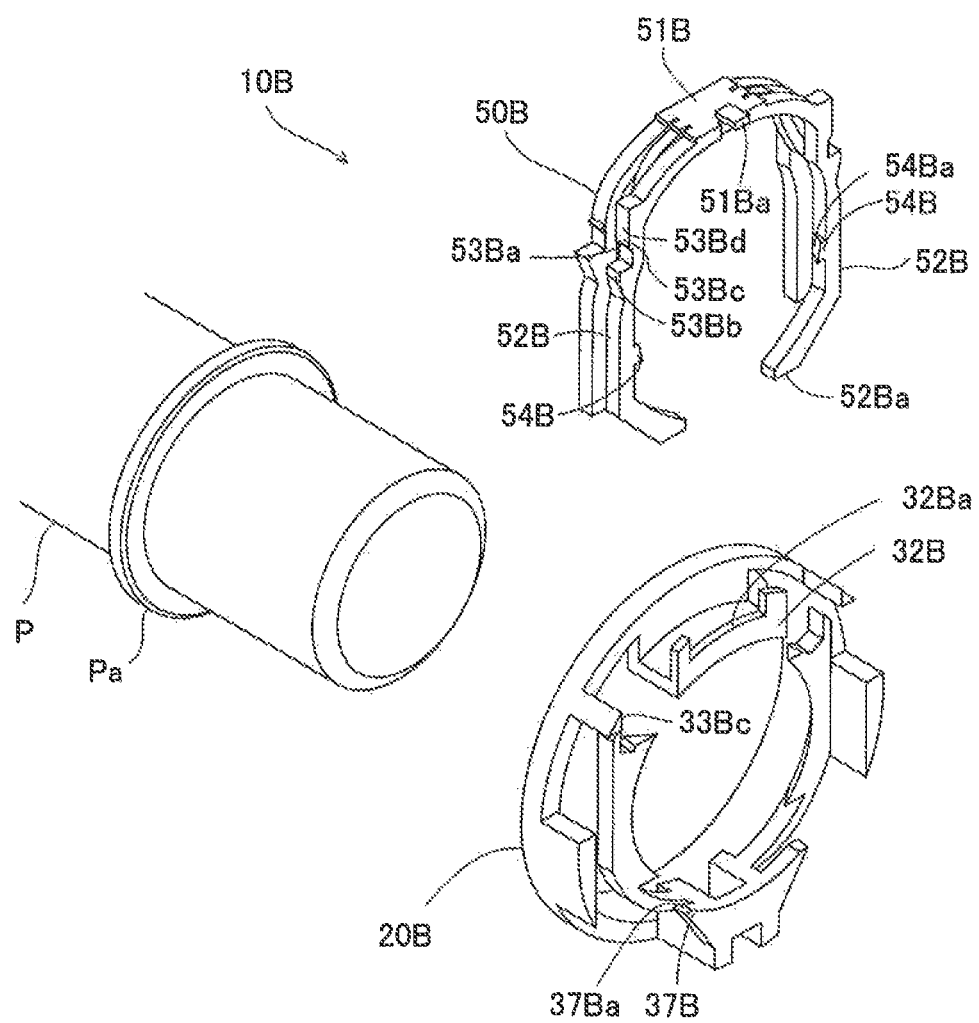
FIG. 14 is an exploded perspective view of the housing and checker of the connector according to the second embodiment.

FIG. 14 is an exploded perspective view of a housing 20B and a checker 50B of a connector 10B according to the second embodiment. The present embodiment is characterized by the configuration of the checker 50B. In other words, portions to be pressed 54B having a press-down plane 54Ba are respectively provided protruded from the interior of activation pieces 52B on both sides of a checker base 51B of the checker 50B. The portions to be pressed 54B are located about midway along the vertical length of the activation piece 52B shown in the figure, being arranged to face each other in the direction of a distance passing through the center of the pipe P. In other words, the portions to be pressed 54B are formed in a pair in the horizontal direction (diagonal to the insertion direction of the checker 50B) at the maximum distance to detect the flange Pa of the pipe P. Also, at the bottom free end of the activation piece 52B, a latching catch 52Ba where a latching end 37Ba of a locking stopper 37B is to be latched to.

Figure 15A:
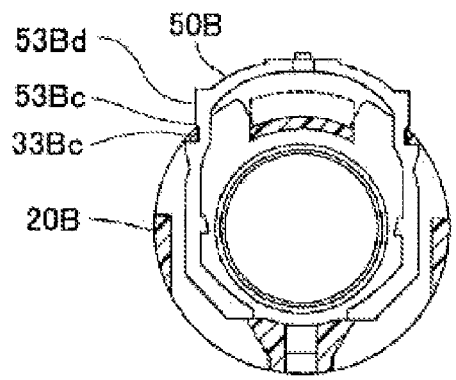
FIGS. 15A, 15B and 15C show the connecting operation of the connector.
Figure 15B:
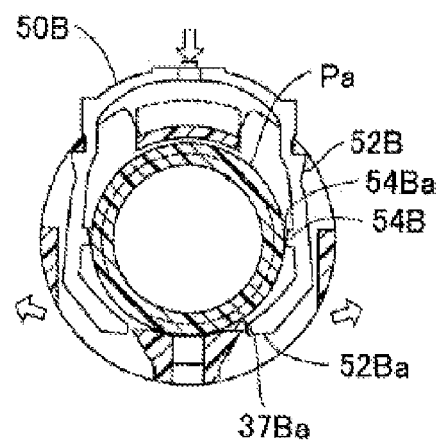
Figure 15C:
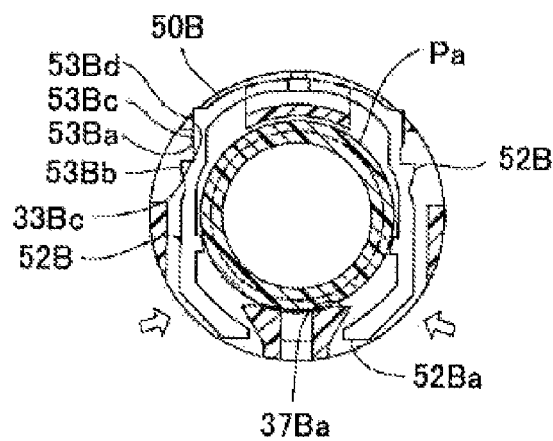

Next, the connecting action of the connector 10B will be explained. FIG. 15 is a diagram explaining an action of the activation piece 52B among the actions of connecting the connector 10B to the pipe P. As shown in FIG. 15A, assume that the checker 50B is at the retaining position. As shown in FIG. 15B, once the flange of the pipe P overrides the retaining portion of the retainer (see FIG. 12A) from the condition to be further inserted into the connection hole, the flange Pa of the pipe P pushes the press-down plane 54Ba (FIG. 14) of the portion to be pressed 54B to expand the distance of the activation piece 52B. Under these conditions, the latching catch 52Ba at the bottom of the activation piece 52B has moved to a location where it does not hit the latching end 37Ba of the locking stopper 37B, that is, the outer peripheral side beyond the latching end 37Ba. Then, as shown in FIG. 15C, after pushing down the checker 50B, the latching catch 52Ba at the bottom of the activation piece 52B passes through the outer peripheral side of the location where the latching end 37Ba of the locking stopper 37B does not hit the latching edge 37Ba to allow the checker 50B to move downward. Thus, since the checker 50B cannot be lowered unless the pipe P is inserted to the normal connection position where the flange Pa of the pipe P expands the distance of the activation piece 52B, it is possible to confirm that the pipe P is at the normal connection position judging from the movement of the checker 50B to the connection confirmation position.

Figure 16:
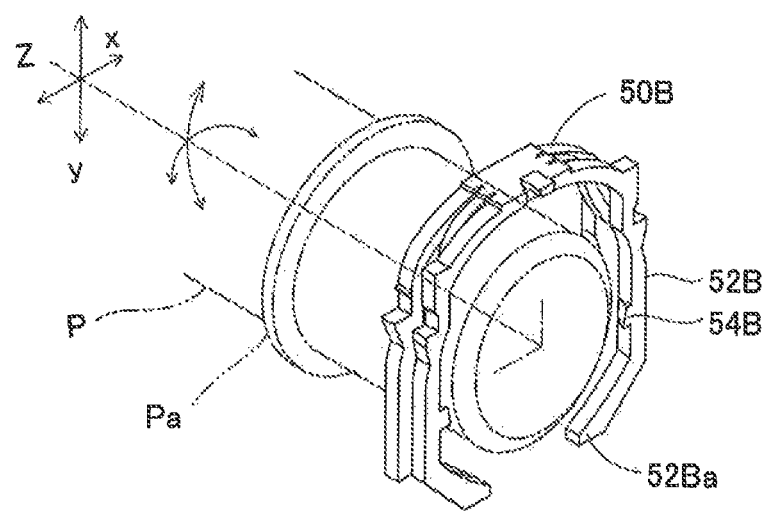
FIG. 16 shows the mechanism of the press-in portion of the activation piece of the checker.

FIG. 16 is a diagram explaining the mechanism of the portion to be pressed 54B of the activation piece 52B. The portions to be pressed 54B on both sides of the activation piece 52B are arranged at a maximum distance from each other in the horizontal direction of the activation piece 52B. This configuration prevents the end portions of the activation piece 52B from opening even if the pipe P is inserted into the insertion hole in a direction different from the normal insertion direction Z, that is, in a direction tilted toward the vertical direction y, and allows the pipe P to push the portions to be pressed 54B on both sides, when the tilting of the pipe P in the vertical direction is corrected, so as to expand the distance of the activation piece 52B. Also, when the pipe P inserted into the insertion hole off the right insertion direction toward the horizontal direction x, the activation piece 52B does not open and the distance thereof can be expanded only after the tilting of the pipe P in the horizontal direction is corrected so as to let the flange Pa of the pipe hit the press-down portions 54B on both sides.

Therefore, compared to the configuration where a portion to be pressed is provided at the free end of the activation piece as in the first embodiment, the precision of so-called detection action can be enhanced by allowing the checker 50 to move to the connection confirmation position only when the pipe P is inserted to the normal position.

As shown in FIG. 14, third engagement protrusions 53Bc project from the outer wall of the activation pieces 52B of the checker 50B. The third engagement protrusion 53Bc includes a restriction wall 53Bd which is formed to extend the peek of the first engagement protrusion 53Ba with the same height of first engagement protrusion 53Ba. The restriction wall 53Bd is configured to slide with the engagement catch 33Bc in contact with each surface during the insertion operation of the checker 50B. As shown in FIG. 15C, when the checker 50B is inserted from the connection confirmation position, the restriction wall 53Bd comes in planer contact with the engagement catch 33Bc, preventing the checker 50B from tilting during the insertion operation. Specifically, if the checker 50B is inserted into the housing in a tilting state, one of the third engagement protrusions 5313c rides over the engagement catch 3313c, and then the pressed portion 54B fits the flange Pa. With the operation, since other third engagement protrusion 53Bc can not ride over the engagement catch 33Bc, the checker 50B returns to the original position if forcibly pushed. The checker 50B can be inserted to the connection confirmation position only when both pressed portion (54B) fit the flange Pa at the same time the checker 50B moves in the normal movement. With the construction, the checker 50B can be inserted in the normal insertion direction.

As shown in FIG. 15A, since the restriction wall 53Bd with the large area requires a large amount of force to ride over the engagement catch 33Bc, the checker 50B does not inadvertently move in the insertion direction.

As shown in FIG. 14, a press-in prevention protrusion 51Ba is formed at the checker base 51B of the checker 50B. The press-in prevention protrusion 51Ba is formed so as to hit a latch portion 32Ba of a rear wall 32B when the checker 50B is at the connection confirmation position. An operation to release the checker 50B is performed by snapping the press-in prevention protrusion 51Ba by a jig and the like to release the interference of the press-in prevention protrusion 51Ba with the latch portion 32Ba and pressing in the checker 50B. Therefore, without the operation of snapping, the press-in prevention protrusion 51Ba is abutted against the latch portion 32Ba of the housing 20B to prevent the checker 50B from being pressed in from the connection confirmation position even if the checker 50B is pushed therefrom, which makes it impossible to mistakenly perform the release operation.

The present invention is not limited to the embodiments, but is implementable in various aspects within the range not to deviate from the scope thereof, and the following variation is also possible:

In case of the housing 20 of the embodiments, resin materials different from each other in mechanical strengths were used for the tube connecting portion 22 and the pipe connecting portion 30, which is not the only way, but one resin material per product can be used considering the mechanical strength and flexibility.

Also, in the embodiments, the retainer 40 was integrally formed with the pipe connecting portion 30, but instead, it can be configured separately taking into account the flexibility and assemblability thereof. Also, in the embodiments, the retainer was formed in an arc to surround the connection hole, but as long as it is configured to be engaged with the pipe flange to be able to retain the pipe, it is not limited to the arc shape but also can be a protrusion facing the connection hole, for example.

The connector 10 of the embodiments was explained as a configuration to be applied to a fueling device of a fuel tank, but instead, it can be applied to various other configurations relating to engine fuel pipes and liquid pipes.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A connector that connects a pipe with a flange, the connector comprising;
   a housing that has a connection hole where the pipe is inserted,
   a retainer that has a latching portion arranged at a location facing the connection hole, wherein the latching portion retains the pipe by engaging with the flange, and
   a checker that is supported by the housing at a retaining position and that moves from the retaining position to a connection confirmation position when the pipe is inserted into the connection hole to a normal connection position, wherein,
   the housing includes engagement catches that are arranged at locations where the checker is inserted,
   the checker includes engagement protrusions that engage with the engagement catches to support the checker at the retaining position,
   when the checker is pushed at the normal connection position, the retainer, which engages with the flange at the normal connection position, moves in a direction away from the flange and releases the engagement between the latching portion and the flange such that the pipe is pulled out from the connection hole,
   the checker includes (i) a checker base and (ii) activation pieces that are side cantilevers projecting from both sides of the checker base to surround the connection hole,
   the activation pieces include pressed portions projecting from the activation pieces toward a center of the connection hole, and latching catches at free ends of the activation pieces,
   the pressed portions are disposed midway along a length of the activation pieces such that when the pressed portions are pressed in touch with the flange, the distance between the activation pieces is expanded,
   the retainer is integrally formed with the housing,
   the retainer includes a pair of arc shaped cantilevers that surround the connection hole,
   the retainer includes a load-bearing portion at each free end of the arc shaped cantilevers,
   the checker includes a press-down piece that applies a force to expand a distance between the pair of cantilevers of the retainer by engaging with the load-bearing portion, and
   a press-down end of the press-down piece of the checker is engaged with the load-bearing portion of the retainer at the normal connection position.

2. The connector in accordance with claim 1, wherein:
the housing includes a locking stopper facing the connection hole, and
the checker is restricted in moving from the retaining position to the connection confirmation position by the latching catch engaging with the locking stopper when the checker is at the retaining position, while the checker moves from the retaining position to the connection confirmation position by the pressed portion disengaging with the locking stopper through expanding a distance of the activation pieces when the pipe is at the normal connection position.

3. The connector in accordance with claim 2,
wherein the checker includes a press-in prevention protrusion that engages with a part of the housing when the checker is at the connection confirmation position, and
wherein the press-in prevention protrusion moves in a retracting direction by snapping.

4. The connector in accordance with claim 3,
wherein, the engagement protrusions are disposed on the side cantilever in an insertion direction of the checker so as to clip both ends of the engagement catch, the checker thereby being supported at the retaining position.

5. The connector in accordance with claim 4, wherein,
the engagement protrusion includes a restriction wall that comes in contact with the engagement catch by each surface during the insertion operation of the checker, the restriction wall preventing the checker from tilting during the insertion operation of the checker.

6. The connector in accordance with claim 1,
wherein the checker includes a press-in prevention protrusion that engages with a part of the housing when the checker is at the connection confirmation position, and
wherein the press-in prevention protrusion moves in a retracting direction by snapping.

7. The connector in accordance with claim 6, wherein,
the engagement protrusions are disposed on the side cantilever in an insertion direction of the checker so as to clip both ends of the engagement catch, the checker thereby being supported at the retaining position.

8. The connector in accordance with claim 1, wherein,
the engagement protrusions are disposed on the side cantilever in an insertion direction of the checker so as to clip both ends of the engagement catch, the checker thereby being supported at the retaining position.

9. The connector in accordance with claim 8, wherein,
the engagement protrusions are arranged to an upper side on activation pieces.

10. The connector in accordance with claim 1, wherein,
each activation piece includes at least one of the engagement protrusions with a restriction wall that comes in contact with the engagement catch by each surface during the insertion operation of the checker, the restriction wall preventing the checker from tilting during the insertion operation of the checker.

11. The connector in accordance with claim 1 wherein,
the pressed portion has a flat press-down plane that contacts the flange.

12. The connector in accordance with claim 1, wherein,
when the checker is pushed, the retainer elastically deforms around the retainer base as a fulcrum.

* * * * *